United States Patent [19]

Muellner et al.

[11] Patent Number: 5,060,264
[45] Date of Patent: Oct. 22, 1991

[54] RADIOTELEPHONE CONTROLLER CONFIGURED FOR CORESIDENT SECURE AND NONSECURE MODES

[75] Inventors: Grazyna E. Muellner, Bartlett; Rafaele Pini, Norridge; Dennis Cashen, Lake Zurich; Patrick J. Marry, Cary, all of Ill.; David K. Ford, Mesa, Ariz.

[73] Assignee: Motorola, Inc., Schaumburg, Ill.

[21] Appl. No.: 461,570

[22] Filed: Jan. 5, 1990

[51] Int. Cl.⁵ ............................................. H04L 9/00
[52] U.S. Cl. ..................................... 380/46; 380/23; 380/33
[58] Field of Search ........................... 380/46, 23, 33

[56] References Cited

U.S. PATENT DOCUMENTS

| | | | |
|---|---|---|---|
| 4,228,321 | 10/1980 | Flanagan | 380/33 |
| 4,368,357 | 1/1983 | Gurak | 380/33 |
| 4,555,805 | 11/1985 | Talbot | 380/33 |
| 4,560,832 | 12/1985 | Bond et al. | 380/33 |

Primary Examiner—Thomas H. Tarcza
Assistant Examiner—David Cain
Attorney, Agent, or Firm—Raymond A. Jenski; Rolland R. Hackbart

[57] ABSTRACT

A controller for a radiotelephone having the capability of operation in both a secure mode for call authorization and a nonsecure mode for user interface is disclosed. The nonsecure mode and secure mode of operation are both resident in a single microcontroller which runs the nonsecure operations until a requirement for the secure operation is requested during call placement. The nonsecure mode is disabled during the period of time the secure mode is operational and is reenabled upon completion of the secure mode operation. The secure mode cannot be accessed externally to the microcontroller.

8 Claims, 3 Drawing Sheets

RADIOTELEPHONE CONTROLLER CONFIGURED FOR CORESIDENT SECURE AND NONSECURE MODES

BACKGROUND OF THE INVENTION

The present invention is generally related to a controller for a radiotelephone, and more particularly to a radiotelephone microcontroller having a secure mode of operation and a nonsecure mode of operation, each mode sharing common portions of a microcontroller while retaining independent secure and nonsecure functions.

Previously, operation in two separate and functionally distinct modes—providing secure operation for one application and nonsecure operation for another—has been accomplished using several microcontrollers. Each microcontroller would operate in a wholly independent fashion, employing separate hardware while operating simultaneously beginning at power up. As a particular example, a mobile radiotelephone system such as that employed in the Nordic countries (and generally known as the Nordic Mobile Telephone, or NMT) and implementing SIS (Subscriber Identity Security—which is further defined in SIS Addendum to NMT DOC 900-3, dated July 1, 1988) has required three microcontrollers. The first microcontroller, the main system microcontroller, has been responsible for the radiotelephone system process execution. The second microcontroller, the display microcontroller, has been responsible for both display and keypad functions and interface with the radiotelephone user. The third microcontroller, the SIS microcontroller, has been responsible for the security of the SAK (Subscriber Authentication Key, the telephone call authorization number which is further described in SIS Addendum to NMT DOC 900-3 dated July 1, 1988 and as defined by each of the Nordic countries) and intermediate calculations required in the use of the SAK. The SAK itself is a random and user-specific 120 bit binary word which, among other parameters, is programmed into the radiotelephone unit at the point at which the user takes possession of the radiotelephone equipment. It is used when a radiotelephone call is to be made to ensure that the radiotelephone equipment is authorized to make a call. Typically, the SAK is not used in receiving a call.

In miniature portable radiotelephones (such as the MICROTAC portable radiotelephone available from Motorola, Inc. as model number F09EFD6930AA) physical space is at a premium and techniques of reducing the size of the electronic circuitry are required to achieve the necessary size reductions. Merely increasing the processing capacity of one microcontroller and loading both the nonsecure and the secure operating modes into the one microcontroller does not protect the secure operation mode from undesired external access. Furthermore, since the secure operation mode includes not only the storage and handling of the SAK but also the calculations and intermediate results from the calculation, both the storage and the calculations must be protected from access.

SUMMARY OF THE INVENTION

Therefore, it is an object of the present invention to provide a unique portable radiotelephone having a controller which functions in both a secure mode of operation and a nonsecure mode of operation.

It is another object of the present invention to provide a unique portable radiotelephone having a controller which employs a single microcontroller for both the secure and the nonsecure mode of operation.

Accordingly, these and other objects are realized in the present invention which encompasses a portable radiotelephone having a microcontroller operable in a secure and a nonsecure mode of operation and having a secure storage for a subscriber authorization key and a secure calculation means which cannot be accessed external to the controller. The microcontroller further communicates with an external user interface device in a nonsecure mode of operation. When the secure mode of operation is enabled the nonsecure mode is disabled.

DETAILED DESCRIPTION OF THE PREFERRED EMBODIMENT

Figure 1:
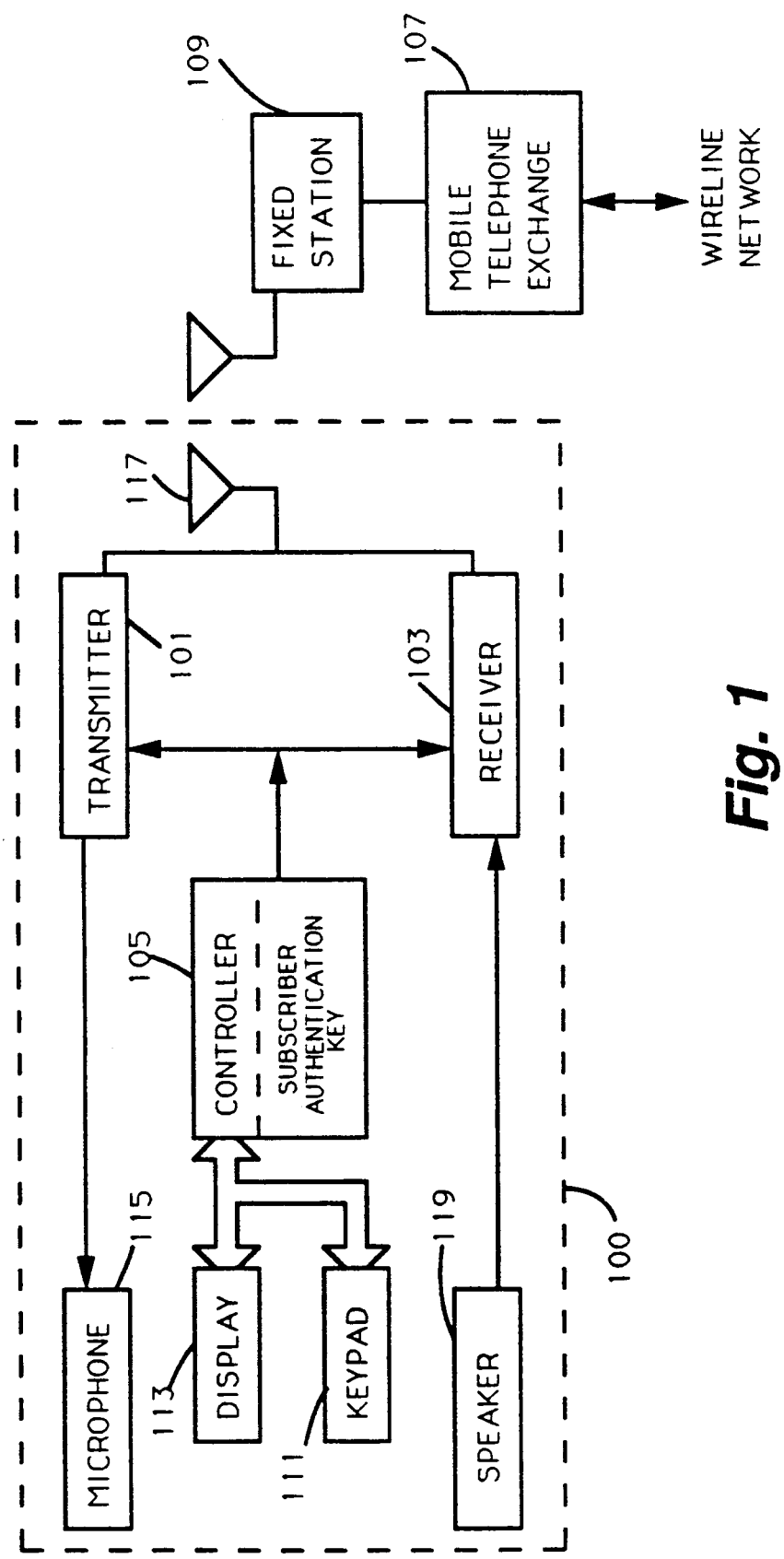
FIG. 1 is a block diagram of a radiotelephone system which may employ the present invention.

A portable radiotelephone 100 adapted to be used in a radiotelephone system such as the Nordic Mobile Telephone (NMT) system is shown in FIG. 1. This portable radiotelephone 100 comprises a conventional radiotelephone transmitter 101 and receiver 103 to provide radio communications. The radiotelephone transmitter 101 and receiver 103 are controlled by a controller 105 which further uses a Subscriber Authentication Key (SAK) to authorize radiotelephone calls from the portable radiotelephone 100 to the wireline network via a Mobile Telephone eXchange (MTX) 107 and a fixed station 109. The user interfaces with the portable radiotelephone 100 via a conventional telephone-type matrix keypad 111 and an alphanumeric character display 113. User-generated acoustic energy is converted to an electrical signal by microphone 115 and coupled to transmitter 101 for modulation upon a radio frequency carrier and transmission from an antenna 117. Radio frequency signals received on antenna 117 from the fixed station 109 are converted to an electrical signal by receiver 103 and coupled to speaker 119 for conversion to acoustic energy for the user to hear.

Figure 2:
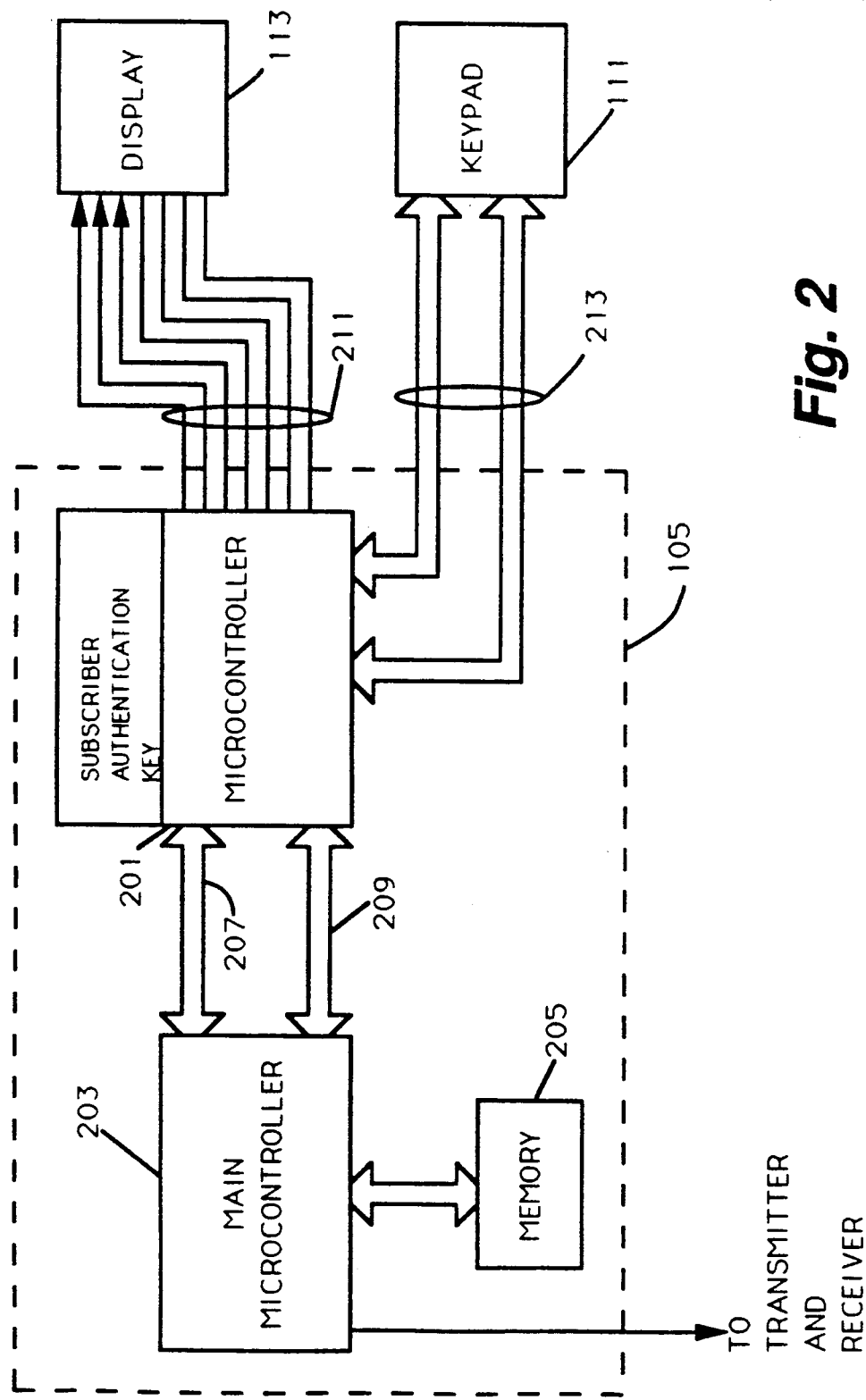
FIG. 2 is a block diagram of a controller for the radiotelephone of FIG. 1 which may employ the present invention.

Referring now to FIG. 2, a more detailed block diagram of controller 105 may be seen. A shared mode microcontroller 201, herein referred to as the SIS/Display Controller (SDC), functions in a nonsecure mode to communicate with and control the keypad 111 and the display 113, and functions in a secure mode to use the SAK. In the preferred embodiment, the SDC is a 68HC11E9 microcontroller available from Motorola, Inc. The controller accomplishes the support of both the Subscriber Identity Security (SIS) and the display/keypad functions by command interrupt switching between the two different and functionally distinct modes. Upon power-up and under standard operation the SDC 201 operates in Display Mode until an SIS calculation is requested. Upon receiving this request, the SDC exist the nonsecure Display Mode and enters the secure SIS Mode. In the preferred embodiment, the SIS Mode is requested when the user wishes to make a radiotelephone call. Upon the user's request to make a call, the portable radiotelephone 100, conventionally under the control of main microcontroller 203 and the controlling program stored in memory 205, commences a radio transmission of the request to the fixed station 109 and the MTX 107. The MTX 107 and the fixed station 109 generate a random number and transmit the random number to the portable radiotelephone 100. (In the preferred embodiment, the main microcontroller is a 68HC11A8, available from Motorola, Inc.) The receiver 103 demodulates the transmission and presents the random number to the main microcontroller 203. The main microcontroller, in turn, presents the random number to the SDC 201 which calculates a signed response (SRES) from both the random number and the SAK. The SRES is transmitted back to the fixed station 109 and MTX 107 via the main microcontroller 203 and transmitter 101. If the SRES matches the independently calculated SRES of the MTX, a call is allowed; if the SRES does not match the call is terminated. Upon completion of the calculation of SRES by SDC 201, the SDC 201 exits the SIS Mode and returns to the Display Mode.

In the preferred embodiment, in order to maintain both the SRES calculating algorithm and the SAK secret, both the object code and the SAK are programmed into internal EEPROM of the SDC 201. All calculations are performed in the SDC 201 in "single chip" mode where access to the memory is limited to onboard functions and any intermediate results are stored in internal RAM. Only information which is sent back to the fixed station 109 and MTX 107 is sent to the main microcontroller 203 via the SIS bus. (Even though the chip operates in "single chip" mode, it is possible to read internal EEPROM by putting the chip into bootstrap mode. To prevent this, the configuration register's conventional NOSEC bit is set, forcing the internal EEPROM to be erased whenever bootstrap mode is entered. Since the SAK is stored, inter alia, in internal EEPROM, this feature ensures its security).

The SIS Mode and the Display Mode use separate busses to communicate with the attached devices. The SIS bus 207 couples between the SDC 201 and the main microcontroller 203 and is composed of two serial lines: transmit (SCI txd) and receive (SCI rxd). The Display Mode uses three busses: (1) a three wire bus 209 employing a bidirectional self-clocking configuration such as described in U.S. Pat. No. 4,369,516 for communication with the main microcontroller 203; (2) Port "C" bus 211, employing seven lines for communication with the ten digit LCD (Liquid Crystal Display) dot matrix display 113; and (3) the combined Port "E" and Port "B" as bus 213 for monitoring the keypad by row and column.

Figure 3:
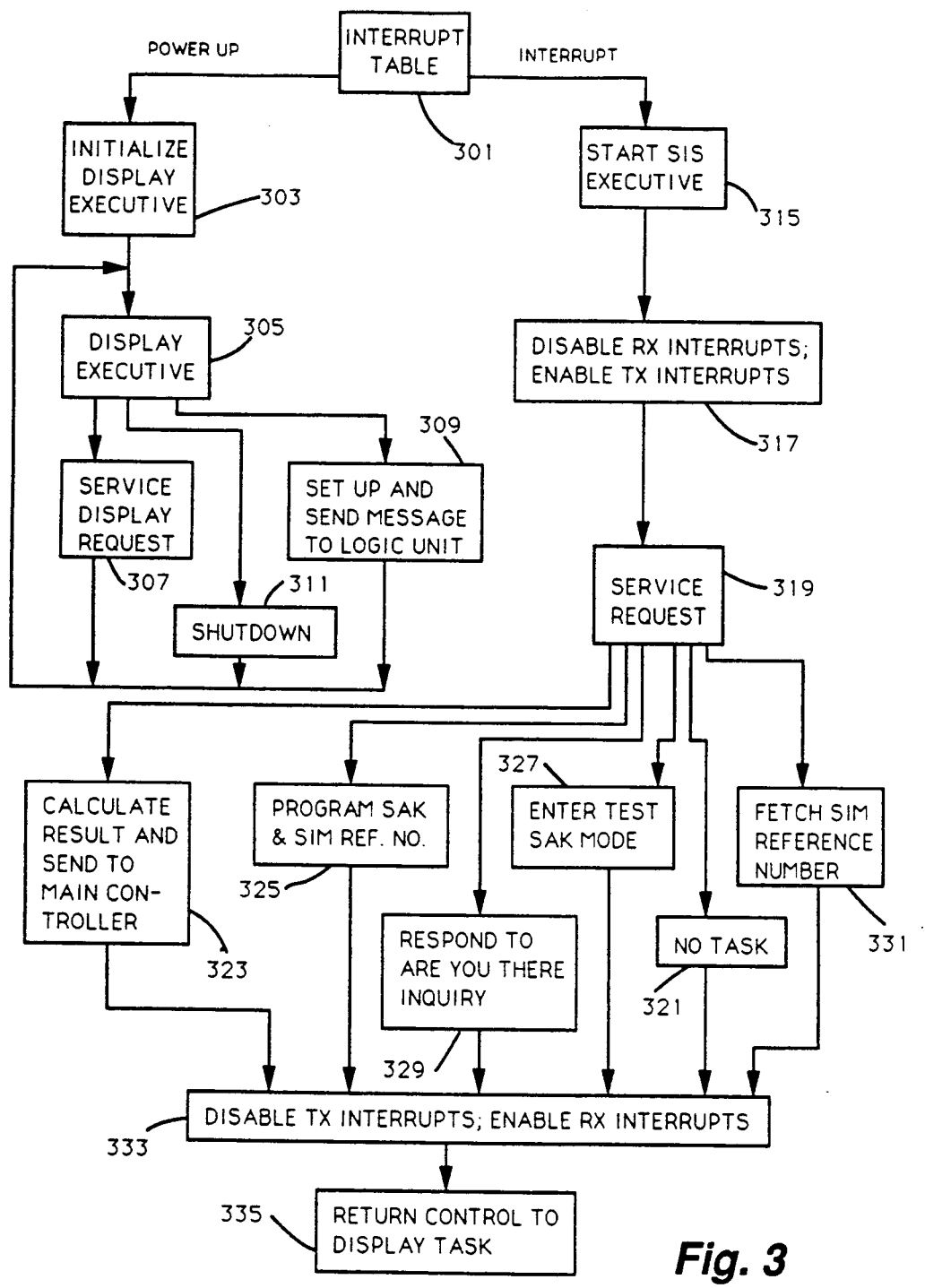
FIG. 3 is a flowchart of the process employed by the radiotelephone of FIG. 1 to realize the present invention.

The process employed by SDC 201 in realizing the present invention is shown in the flowchart of FIG. 3. Commencing at the interrupt table 301, at power-up the Display Mode executive process is initialized at 303 and the Display Mode executive (main program) continues to run in the nonsecure mode. Standard control of messages written into the display 113 or of detection and decoding of keypad 111 key presses are serviced by service display request block 307. Communications with main microcontroller 203 via bus 209 are maintained by the process of block 309. Power shut down may be detected by the process of block 311 which, in the preferred embodiment, detects the depression of a power-off button. Return from each of the three nonsecure processes is to the Display Mode executive at 305.

Upon detection of a request for service via the SIS bus 207, the process leaves the Display Mode and starts the SIS executive at 315. In the preferred embodiment, the display 113 is frozen and keypad 111 is ignored during the SIS executive and subsequent processes. Reception of additional messages from the SCI rxd bus line is disabled and the SCI txd line is enabled at 317 and the particular request from the SIS bus 207 is decoded from among six types of requests at 319. If the request is garbled or nonsensical the no task process at 321 is followed and the request is ignored. If the random number sent by the MTX 107 and the fixed station 109 has been received and conveyed by the main microcontroller 203 via SIS bus 207 the SRES is calculated from the random number and the SAK and returned via the SCI txd line of SIS bus 207, at 323. If the SAK is initially being stored in the portable radiotelephone 100, the process of accepting, storing, and verifying the SAK and the Sim (the manufacturer's reference number) is accomplished at 325 in accordance with "Specification for NMT-SIS Key Management for NMT-900", dated July 1, 1988. In the preferred embodiment, a second SAK, publically known, is used for test purposes. A test mode, at 327, may be entered via SIS bus 207 command in which the public SAK is used for test radiotelephone calls. Upon power-up, a test is made, at 329, in response to a SIS bus 207 command to check for proper operation of the SIS system and whether a SAK has been stored in the EEPROM of SDC 201. Also, a request via SIS bus 207 for the manufacturer's reference number (Sim) causes the Sim to be recalled from the EEPROM of SDC 201 and sent to the display 113. At the conclusion of the requested one of the six tasks, the SCI txd line interrupt is disabled and the SCI rxd line is enabled of SIS bus 207 at 333 and operation returns to the nonsecure Display Mode at 335.

Thus, a controller for a portable radiotelephone having the capability of operation in both a secure mode and a nonsecure mode of operation has been shown and described. The nonsecure mode and secure mode are both resident in a single microcontroller which runs the nonsecure operations until a requirement for the secure operation is requested. The nonsecure mode is disabled during the period of time the secure mode is operational and is reenabled upon completion of the secure mode operation. The secure mode cannot be accessed externally to the microcontroller. While a particular embodiment of the invention has been shown and described, it is to be understood that the invention is not to be taken as limited to the specific embodiment herein, and that changes and modifications may be made without departing from the true spirit of the invention. It is contemplated therefore to cover the present invention, and any and all such changes and modifications, by the appended claims.

We claim:

1. A controller for a radiotelephone apparatus which communicates with a fixed site, the controller having an internal secure mode of operation and an internal nonsecure mode of operation, comprising:

means for inputting a message received from the fixed site;

means, responsive to said message, for calculating a signed response from a stored numerical subscriber authentication key, such that said numerical subscriber authorization key and said calculations cannot be accessed external to the controller;

means for communicating with a radiotelepone apparatus user interface device external to the controller; and means for enabling said means for calculating and for disabling said means for communicating when said means for calculating is enabled.

2. A controller for a radiotelephone apparatus in accordance with claim 1 wherein said means for enabling further comprises means for determining a requirement for said signed response calculation.

3. A radiotelephone apparatus which generates and transmits a signed response when making a radiotelephone call, the signed response calculated from a random number and a subscriber authorization key and in which both the subscriber authorization key and the calculation is performed in a secure fashion in a controller, the radiotelephone apparatus comprising:

means in the controller for storing the numerical subscriber authentication key and for calculating the signed response therefrom, such that the numerical subscriber authorization key and the calculations cannot be accessed external to the controller;

means for communicating in a nonsecure manner with a keypad external to the controller whereby key depressions may be detected;

means for determining a requirement for said signed response calculation; and means for enabling said means for storing and calculating and for disabling said means for communicating when said means for storing and calculating is enabled.

4. A method of generating a signed response when making a radiotelephone call in a radiotelephone apparatus, the signed response calculated from a random number and a stored subscriber authorization key and in which both the subscriber authorization key and the calculation is performed in a secure fashion in a radiotelephone apparatus controller, the method comprising:

calculating the signed response from the stored subscriber authentication key, such that the numerical subscriber authorization key and the calculations cannot be accessed eternal to the controller;

communicating in a nonsecure manner with a keypad external to the controller whereby key depressions may be detected;

determining a requirement for said signed response calculation; and enabling said calculating step and disabling said communicating step.

5. A controller for a radiotelephone apparatus, the controller internally sharing processing modes, comprising:

means for receiving an input from a radiotelephone apparatus user interface device external to the controller;

means for processing said input in a nonsecure mode;

means for detecting a requirement for a secure processing mode;

means for disabling reception of said input;

means for calculating a signed response from a numerical subscriber authentication key in a secure processing mode; and means for reenabling said disabled input reception.

6. A method of sharing internal processing modes in a controller for a radiotelephone apparatus, comprising the steps of:

receiving an input from a radiotelephone apparatus user interface device external to the controller;

processing said input in a nonsecure mode;

detecting a requirement for a secure processing mode;

disabling reception of said input;

calculating a signed response from a numerical subscriber authentication key in a secure processing mode; and reenabling said disabled input reception.

7. A microcontroller for a radiotelephone apparatus, the microcontroller internally sharing processing modes, comprising:

means for receiving user information from a radiotelephone apparatus user interface device external to the microcontroller;

means for processing received user information in a nonsecure processing mode;

means for detecting a requirement for a secure processing mode;

means for disabling reception of said user information in response to said detected requirement;

means for receiving service request information and calculating a signed response from a stored subscriber authorization key in a secure processing mode internal to the microcontroller;

means for transmitting said calculated signed response; and means for reenabling said disabled reception of said user information.

8. A method of sharing processing modes in a microcontroller for a radiotelephone apparatus, the method comprising the steps of:

receiving user information from a radiotelephone apparatus user interface device external to the microcontroller;

processing said received information in a nonsecure processing mode;

detecting a requirement for a secure processing mode;

disabling reception of said user information in response to said detecting step;

receiving service request information and calculating a signed response from a stored subscriber authorization key in a secure processing mode internal to the microcontroller;

transmitting said calculated signed response; and reenabling said disabled reception of said user information.

* * * * *